(12) United States Patent
Poulin et al.

(10) Patent No.: US 8,345,680 B2
(45) Date of Patent: Jan. 1, 2013

(54) HANDLING OUT-OF-SEQUENCE PACKETS IN A CIRCUIT EMULATION SERVICE

(75) Inventors: Andre Poulin, Gatineau (CA); Andrian Ellsworth, Stittsville (CA); Michel Rochon, Kanata (CA); Wayne Groff, Kanata (CA)

(73) Assignee: Alcatel Lucent, Paris (FR)

(*) Notice: Subject to any disclaimer, the term of this patent is extended or adjusted under 35 U.S.C. 154(b) by 787 days.

(21) Appl. No.: 12/437,274

(22) Filed: May 7, 2009

(65) Prior Publication Data

US 2010/0284397 A1 Nov. 11, 2010

(51) Int. Cl.
*H04L 12/28* (2006.01)
*H04L 12/56* (2006.01)

(52) U.S. Cl. .................................. 370/389; 370/394

(58) Field of Classification Search ................ None
See application file for complete search history.

(56) References Cited

U.S. PATENT DOCUMENTS

| 5,450,410 | A | * | 9/1995 | Hluchyj et al. | 370/394 |
|---|---|---|---|---|---|
| 5,914,954 | A | * | 6/1999 | Nakayama | 370/394 |
| 6,031,960 | A | * | 2/2000 | Lane | 386/326 |
| 7,417,991 | B1 | * | 8/2008 | Crawford et al. | 370/394 |
| 2001/0033575 | A1 | * | 10/2001 | Shimamura et al. | 370/419 |

OTHER PUBLICATIONS

The ATM Forum Technical Committee, Circuit Emulation Service Interoperability Specification Version 2.0, af-vtoa-0078.000 Jan. 1997.
Vainshtein A. et al., rfc5086, Structure-Aware Time Division Multiplexed (TDM) Circuit Emulation Service over Packet Switch Network (CESoPSN), Network Working Group, Request for Comments: 5086, Dec. 2007.
ITU-T Series I: Integrated Services Digital network, Overall network aspects and functions—Protocol layer requirements, B-ISDN ATM Adaptation Layer specification: Type 1 AAL Dated Aug. 27, 1996.

* cited by examiner

*Primary Examiner* — Chirag Shah
*Assistant Examiner* — Minh-Trang Nguyen
(74) *Attorney, Agent, or Firm* — Kramer & Amado, P.C.

(57) ABSTRACT

Various exemplary embodiments relate to a method and related network node having a playout buffer including one or more of the following: receiving a first packet, a second packet, a first set of at least one subsequent packet, wherein each packet includes a sequence number (SN); determining that the second packet is not in sequence with the first packet by determining that the SN of the second packet is not equal to the SN of the first packet plus an expected increment value; determining whether the second packet represents a jump in SNs by determining whether the SN of a first subsequent packet is equal to the SN of the second packet plus the expected increment value; and when the second packet represents a jump in SNs, gradually normalizing the playout buffer upon receipt of each subsequent packet.

20 Claims, 9 Drawing Sheets

HANDLING OUT-OF-SEQUENCE PACKETS IN A CIRCUIT EMULATION SERVICE

TECHNICAL FIELD

Embodiments disclosed herein relate generally to emulation of circuit-switched services in a packet-switched network and, more particularly, to manipulation of playout buffer levels in response to out of sequence packets.

BACKGROUND

In many legacy telecommunications networks, circuit switching is used to establish a fixed bandwidth channel between nodes and terminals to allow users to communicate. As a method of maximizing resource efficiency, multiple data streams are commonly combined into one signal, thereby allowing the data streams to share the physical lines in the data path without interfering with one another. Various multiplexing techniques are known, such as polarization multiplexing, spatial multiplexing (MIMO), wavelength division multiplexing (WDM), frequency division multiplexing (FDM), and time division multiplexing (TDM).

With the rapid development of modern packet-switched networks, however, such circuit switched networks have gradually fallen out of favor as a preferred technology. For example, Voice-Over-Internet Protocol (VoIP) services have replaced many circuit switched services, given VoIP's flexibility, ease of implementation, and reduction in costs. Unfortunately, transitioning to IP-based services requires a service provider to incur significant expenses in expanding its infrastructure and replacing customer premise equipment.

Given the large initial investment, many service providers have been reluctant to make the transition from circuit-based services to corresponding services in packet-switched networks. To help ease the transition, various circuit emulation service (CES) standards have been developed. Such standards allow service providers to gradually make the transition to packet-switched networks, eliminating the need to replace circuit-based equipment and drop support of legacy services.

One example of such a CES standard is TDM circuit emulation service over packet switched network (CESoPSN), as described by Request for Comments (RFC) 5086, "Structure-Aware Time Division Multiplexed (TDM) Circuit Emulation Service over Packet Switched Network (CESoPSN)," published by the Internet Engineering Task Force (IETF) and incorporated herein by reference. This RFC describes a method for encapsulating structured (NxDS0) TDM signals as pseduowires over packet-switching networks (PSNs). In particular, on the ingress end of a TDM pseudowire, a node converts the TDM signals into a plurality of packets, then sends the packets across a packet-based path, or pseudowire. Upon receipt of the packets, a node on the egress end converts the packets back into TDM signals and forwards the TDM signals towards their ultimate destination.

Although CESoPSN standards offer flexibility and reduce expenses, they also introduce problems specific to packet-switched networks. Unlike circuit-based connections, packet-switched networks do not include mechanisms to ensure that nodes in the network send and receive packets at a constant rate. As a result, packet-switched networks inherently introduce a problem known as packet delay variation (PDV). PDV is particularly problematic when using the packet-switched network to emulate a TDM connection, as a multiplexed TDM signal must strictly adhere to timing requirements to ensure proper separation of the streams at the receiving node. PDV can dramatically affect the timing of the signal and, therefore, result in loss of data and affect the user's quality of experience.

The playout buffer is one solution developed to address the problem of packet delay variation when emulating circuit switched connections. A playout buffer regulates packet delay variation by temporarily storing packets, then outputting the packets at regular intervals using a play-out algorithm.

It is important that packets be played out of the playout buffer in the proper sequence, thus accurately reproducing the original circuit-switched signal. For various reasons, however, packets may be received out of sequence. Various solutions, such as RFC 5086, require inserting replacement data into the playout buffer for each skipped packet when a packet has been received out of sequence.

Such solutions, however, fail to properly handle scenarios where the sequence numbers of two consecutively received packets indicate that a number of packets have been skipped. This can happen, for example, after a line card redundancy (LCR) switch at the transmitting node, as sequence numbers assigned to packets are not typically synchronized between an active and an inactive line card of a source node. These scenarios can also occur due to, for example, an automatic protection switch (APS), a rerouting of packets in a network, or network congestion. More specifically, because the playout buffer has a finite size, inserting a dummy packet for each supposedly-skipped packet may potentially fill the playout buffer and cause it to overflow. Even if inserting dummy packets does not immediately cause an overflow, the subsequent arrival of additional packets may result in an overflow. Such an overflow may result in the loss of a portion of the received packets.

For the foregoing reasons and for further reasons that will be apparent to those of skill in the art upon reading and understanding this specification, there is a need for a playout buffer that is capable of handling sequence number errors in successively received packets.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY

In light of the present need for a playout buffer that is capable of handling sequence number errors in successively received packets, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node having a playout buffer including one or more of the following: receiving a first packet, a second packet, a first set of at least one subsequent packet, and a second set of at least one subsequent packet, wherein each packet includes a sequence number (SN); determining that the second packet is not in sequence with the first packet by determining that the SN of the second packet is not equal to the SN of the first packet plus an expected increment value; determining whether the second packet represents a jump in SNs by determining whether the SN of a first subsequent packet of the first set of at least one subsequent packet is equal to the SN of the second packet plus the expected increment value; and when the second packet represents a jump in SNs, gradually normalizing the playout buffer upon receipt of each packet of the second set of at least one subsequent packet.

BRIEF DESCRIPTION OF THE DRAWINGS

In order to better understand various exemplary embodiments, reference is made to the accompanying drawings, wherein.

DETAILED DESCRIPTION

Figure 1:
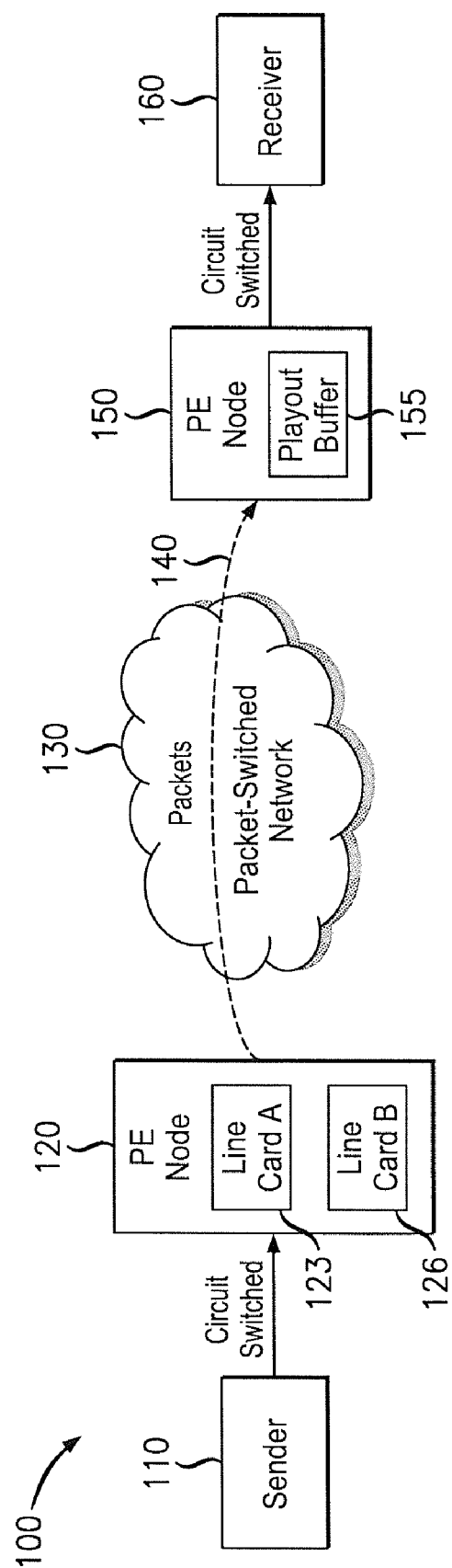
FIG. 1 is a schematic diagram of an exemplary system for implementing a circuit emulation service over a packet-switched network, the system including a node with a playout buffer.

Referring now to the drawings, in which like numerals refer to like components or steps, there are disclosed broad aspects of various exemplary embodiments.

FIG. 1 is a schematic diagram of an exemplary system 100 for implementing a circuit emulation service over a packet-switched network 140, the system including a node 150 with a playout buffer 155. In various exemplary embodiments, system 100 includes a sender 110, a provider edge node 120, a packet switched-network 130, a pseudowire 140, a provider edge node 150 with a playout buffer 155, and a receiver 160.

Sender 110 may be any device suitable for generating and sending signals over a circuit switched network. Thus, sender 110 may be, for example, a wireless base station including a wire line interface to forward data streams into provider edge node 120. For example, sender 110 may be a base transceiver station (BTS) in a 2G network, a node B in a 3G network, or a similar device in a Global System for Mobile Communications (GSM) network, a Universal Mobile Telecommunications System (UMTS) network, a Long Term Evolution (LTE) network, or other wireless network. Sender 110 may also be a component for implementing a Plesiochronous Digital Hierarchy (PDH), a Synchronous Digital Hierarchy (SDH), Synchronous Optical Networking (SONET), T1/E1 wirelines, or suitable replacements that will be apparent to those of skill in the art.

Provider edge node 120 may be configured to receive a circuit-switched signal from sender 110, convert the signal to a plurality of packets, then transmit the packets at a constant interval or rate over a packet-switched network 130. Thus, provider edge node 120 may be a network element such as a router or switch including functionality to enable communication over a pseudowire 140.

Provider edge node 120 may include line cards 123, 126 and implement line card redundancy (LCR). Accordingly, line cards 123,126 may process the same received circuit-switched signal in parallel. Line card A 123 may be initially designated active, while line card B 126 may be initially designated inactive. As such, packets processed by line card A 123 may be forwarded over packet-switched network 130, while packets processed by line card B 126 may be simply discarded. Provider edge node 120 may also be capable of performing an LCR switch, such that line card A 123 may be designated inactive and line card B 126 may be designated active.

In order to ensure that a received circuit-switched signal may be accurately reconstructed at another node, line cards 123, 126 may add a sequence number to each processed packet. Line cards 123, 126 may not synchronize sequence numbers between the two, resulting in a sequence number jump after an LCR switch, as described in greater detail below with reference to FIGS. 3A and 3B.

Packet-switched network 130 may be any network operating in accordance with a packet-based protocol. Thus, network 130 may operate, for example, according to Transmission Control Protocol/Internet Protocol (TCP/IP), Multi Protocol Label Switching (MPLS), Ethernet, Provider Backbone Transport (PBT), or any other suitable packet-based protocol that will be apparent to those of skill in the art.

System 100 may also include a pseudowire 140 for transmitting data between provider edge node 120 and provider edge node 150 over packet-switched network 130. More specifically, pseudowire 140 may comprise one or more hops in packet-switched network 130 for transmission of a plurality of packets that emulate a circuit-switched signal. Pseudowire 140 may be, for example, a time division multiplexing (TDM) pseudowire. Thus, pseudowire 140 may be implemented according to Request For Comments (RFC) 4553, "Structure-Agnostic Time Division Multiplexing over Packet" (SAToP), published by the Internet Engineering Task Force (IETF). Alternatively, pseudowire 140 may be implemented according to RFC 5086, "Structure-Aware Time Division Multiplexed Circuit Emulation Service over Packet-Switched Network" (CESoPSN), also published by the IETF. Suitable variations for implementation of pseudowire 140 will be apparent to those of skill in the art.

Provider edge node 150 may receive, at a constant rate with packet delay variation (PDV), packets transmitted from provider edge node 120 over pseudowire 140. Provider edge node 150 may then convert the packets back into a circuit-switched signal for transmission of the signal to receiver 160. Playout buffer 155 may implement a user-specified delay, such that packets are queued in buffer 155 prior to output to the component used to convert the packets back into a circuit-switched signal. Playout buffer 155 may thereby mitigate the effects of packet delay variation introduced by the network, as provider edge node 150 may properly reconstruct the circuit-switched signal from sender 110.

According to various exemplary embodiments, when PE node 150 receives a packet that is not in sequence with the last received packet, it may wait for at least one further packet in order to determine what corrective action to take. When the further packet is in sequence with the out-of-sequence packet, PE node 150 may assume that a jump in sequence numbers occurred between the out-of-sequence packet and the packet immediately preceding it. In this situation, PE node 150 may proceed to gradually normalize playout buffer 155 by dropping received packets and/or inserting a number of dummy packets into playout buffer 155. The internal components of provider edge node 150, including playout buffer 155, are described in further detail below with reference to FIG. 2.

System 100 may also include a receiver 160, which receives the outputted circuit-switched signal from provider edge node 150. Thus, receiver 160 could be, for example, customer premises equipment, a node, or any other component configured to receive and/or process circuit-switched signals.

Figure 2:
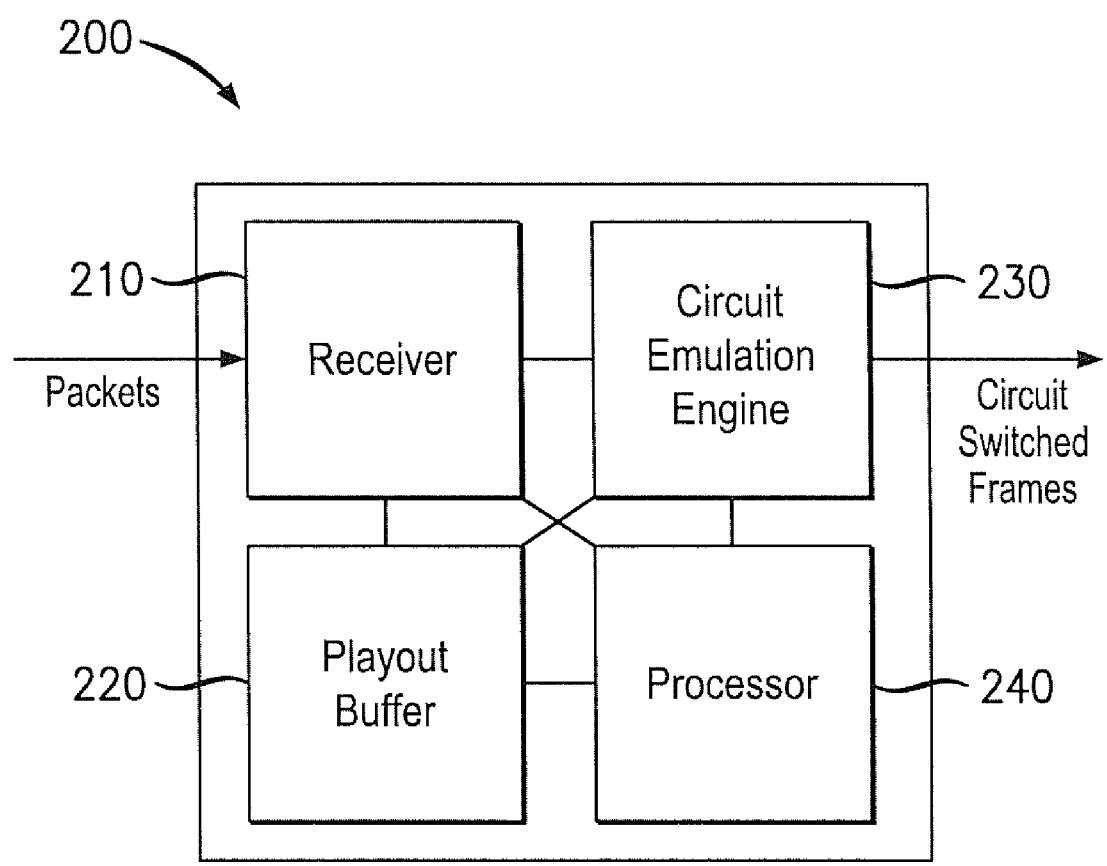
FIG. 2 is a schematic diagram of an exemplary node including a playout buffer for use in the system of FIG. 1.

FIG. 2 is a schematic diagram of an exemplary node 200 including a playout buffer 220 for use in the system 100 of FIG. 1. Node 200 may operate as the last node in a packet-switched network, such that node 200 may receive a plurality of packets and transmit at least one circuit-switched signal. In various exemplary embodiments, node 200 includes a receiver 210, a playout buffer 220, a circuit emulation engine 230, and a processor 240.

Receiver 210 may be an interface comprising hardware and/or software encoded on a machine-readable storage medium configured to receive packets transmitted over a packet-switched network. More specifically, when serving as a receiver of packets transmitted over a pseudowire, receiver 210 may obtain a plurality of fixed-length packets associated with a given circuit-switched signal. Because packet-switched networks generally introduce variable delay in transmission of packets, receiver 210 may experience packet delay variation when obtaining packets over the pseudowire.

Playout buffer 220 may be a component comprising hardware, such as a Field Programmable Gate Array (FPGA), and/or instructions encoded on a machine-readable storage medium configured to temporarily store packets prior to outputting the packets to circuit emulation engine 230. Thus, playout buffer 220 may comprise random access memory (RAM) or any other memory type, provided that playout buffer 220 may store packets from receiver 210 and output the packets to circuit emulation engine 230. Playout buffer 220 may compensate for packet delay variation in packets obtained at receiver 210. In particular, by buffering packets prior to outputting the packets to circuit emulation engine 230, playout buffer 220 may ensure that circuit emulation engine 230 always has data to transmit and sends the circuit-switched signal associated with the packets at a constant rate.

Playout buffer 220 may have a number of user-configurable parameters. Playout buffer 220 may be a jitter buffer as described by RFC 5086. A user may set the maximum fill level or length of playout buffer 220, which specifies the maximum number of packets that may be stored before an overfill error occurs. A user may also set the target fill level, such that playout buffer 220 may not output packets to circuit emulation engine 230 until the current fill level of playout buffer 220 equals or exceeds the target fill level. After playout buffer 220 has begun outputting packets to circuit emulation engine 230, the current fill level may drop below the target fill level without playout buffer 220 stopping such playout.

Circuit emulation engine 230 may be a component comprising hardware and/or software encoded on a machine-readable storage medium configured to receive packets from playout buffer 220 and output the data contained in the packets as a circuit-switched signal. More specifically, circuit emulation engine 230 may be configured to receive a plurality of packets from playout buffer 220, extract the data contained in the packets, then forward the data over a circuit-switched network. The detailed operation and implementation of circuit emulation engine 230 will be apparent to those of ordinary skill in the art.

Processor 240 may be a conventional microprocessor, an FPGA, or any other component configured to execute a series of instructions to control the functionality and interaction of receiver 210, playout buffer 220, and circuit emulation engine 230. In various exemplary embodiments, processor 240 may add packets to playout buffer 220 as they are received at receiver 210, such that the playout buffer 220 reaches a current fill level. Processor 240 may be configured to continue to add packets to playout buffer 220 as they are received.

Processor 240 may be further configured to add a dummy packet to playout buffer 220. The dummy packet may contain a pattern of bits set to, for example, the idle pattern, which contains all "1"s. A dummy packet may be added to playout buffer 220 in order to increase the current fill level of the playout buffer in order to meet a target fill level and begin playout. The dummy packet may be of any size such as, for example, the same size as a normal packet or a fraction thereof. A number of dummy packets may also be added after a packet has been received out of sequence, as will be described in detail below with reference to FIGS. 4A-4C, 5A-5C, and 6-8.

Figure 3A:
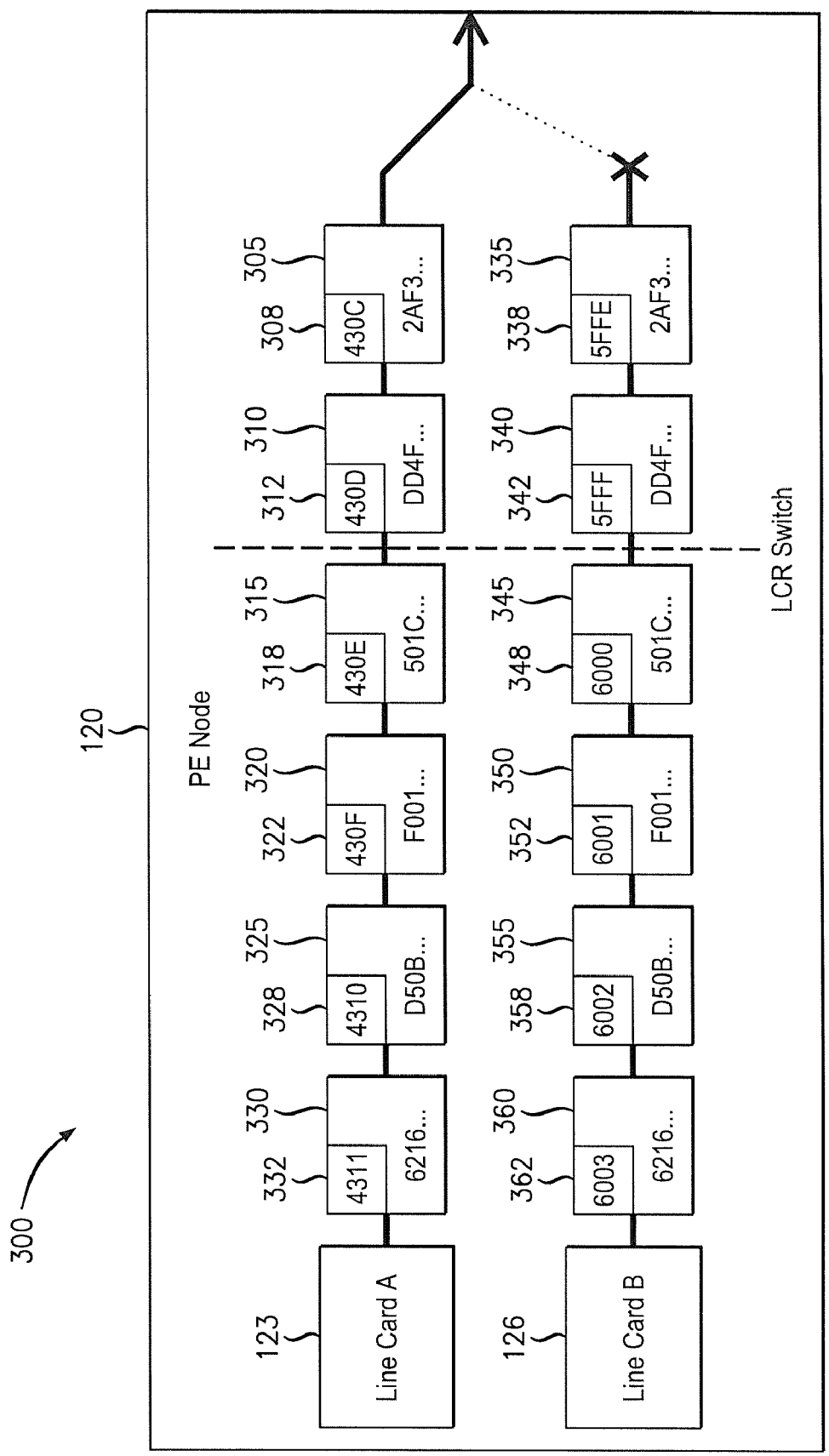
FIG. 3A is a schematic diagram of an exemplary system including a set of packets generated by the sending provider edge node of FIG. 1.

FIG. 3A is a schematic diagram of an exemplary system 300 including a set of packets generated by the sending provider edge node 120 of FIG. 1. System 300 is useful to illustrate one potential source of a jump in sequence numbers: an LCR switch. In a node operating with redundant line cards, such as PE node 120, each line card processes packets in parallel. Only packets processed by the active line card may be forwarded through the network, while packets processed by the inactive line card may simply be discarded. Upon an LCR switch, the roles of the line cards are reversed.

System 300 may include packets 305, 310, 315, 320, 325, 330 processed by Line Card A 123 of PE Node 120. Packets 305, 310, 315, 320, 325, 330 may carry data "2AF3 . . . ", "DD4F . . . ", "501C . . . ", "F001 . . . ", "D50B . . . ", and "6216 . . . " respectively. Packets 305, 310, 315, 320, 325, 330 may also include sequence numbers 308, 312, 318, 322, 328, 332, respectively. Sequence numbers 308, 312, 318, 322, 328, 332 may have values of "430C", "430D", "430E", "430F", "4310", and "4311," respectively.

System 300 may further include packets 335, 340, 345, 350, 355, 360 processed by Line Card B 126 of PE Node 120. Packets 335, 340, 345, 350, 355, 360 may carry data "2AF3 . . . ", "DD4F . . . ", "501C . . . ", "F001 . . . ", "D50B . . . ", and "6216 . . . " respectively. Note that because line cards 123, 126 may operate in parallel, the data contained in packets 335, 340, 345, 350, 355, 360 may be the same as the data contained in packets 305, 310, 315, 320, 325, 330. Note that in practice, because of factors such as differences in clock precision, startup time, configuration time, and dynamics of operation, the data in one packet may not exactly match the data in a parallel packet, but may instead include data from two different parallel packets. For example, packet 310 could include some data included in packet 340 and some data included in packet 345.

Packets 335, 340, 345, 350, 355, 360 may also include sequence numbers 338, 342, 348, 352, 358, 362, respectively. Sequence numbers 338, 342, 348, 352, 358, 362 may have values of "5FFE", "5FFF", "6000", "6001", "6002", and "6003," respectively. Note that if the sequence numbers used by line cards 123, 126 are not synchronized between the line cards 123, 126, the values of sequence numbers 338, 342, 348, 352, 358, 362 may be different than the values of sequence numbers 308, 312, 318, 322, 328, 332. Note further that various implementations of transmitting node 300 may attach sequence numbers of lengths other than 16 bits. Accordingly, various embodiments are adapted to handle sequence numbers of varying lengths.

Figure 3B:
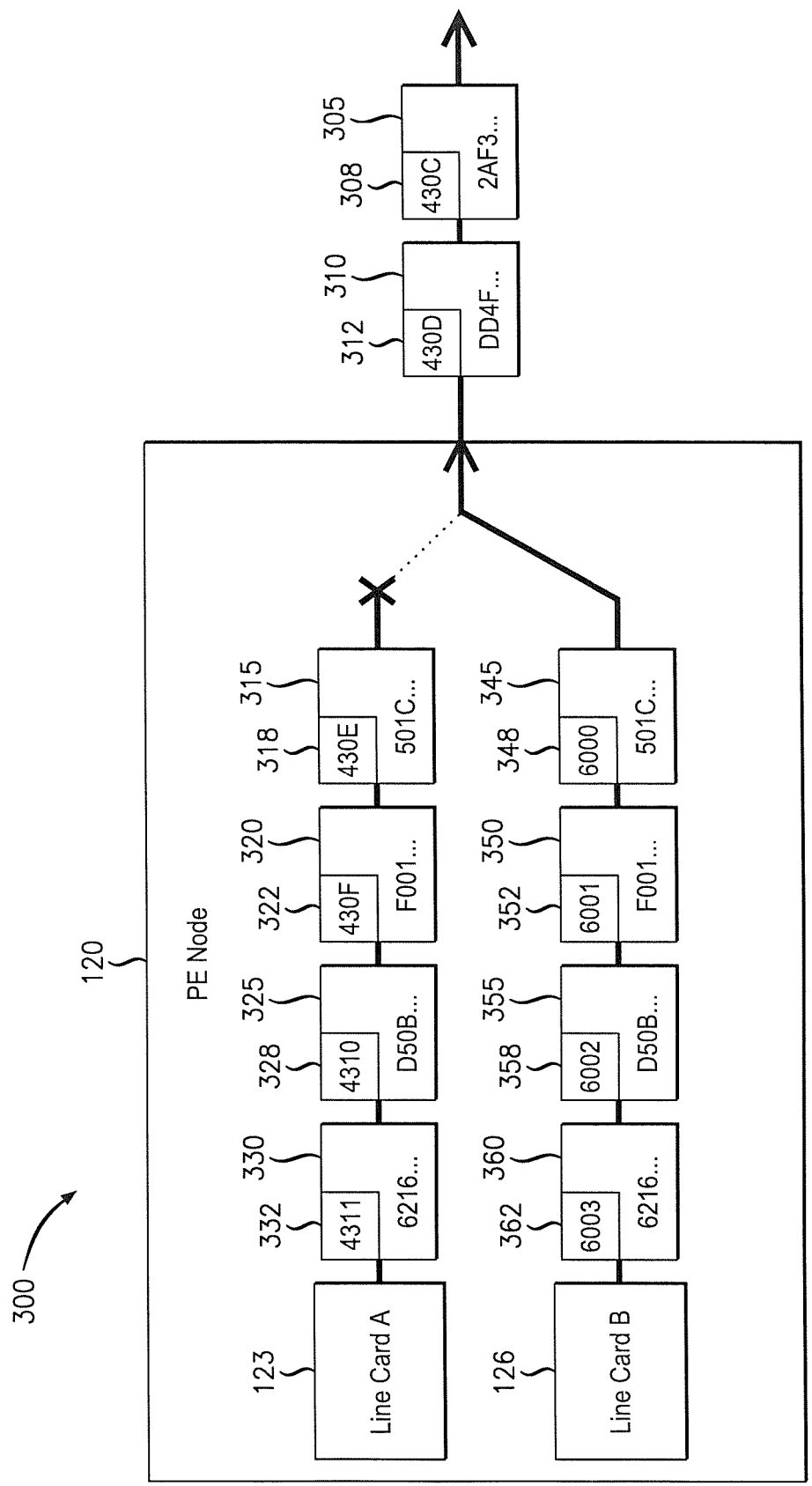
FIG. 3B is a schematic diagram of the exemplary system of FIG. 3A after the occurrence of an LCR switch.

If line card A 123 is initially active then the packets it processes may be forwarded through the network. Thus, packets 305, 310 may be forwarded and packets 335, 340 may be dropped. If, after the processing of packets 310, 340 an LCR switch occurs, as indicated by the dashed line shown in FIG. 3A, line card B 126 may then be designated as active. In this circumstance, packets 345, 350, 355, 360 may be forwarded through the network and packets 315, 320, 325, 330 may be dropped as shown in FIG. 3B. Thus, the packets received by PE Node 150 in this example will be packets 305, 310, 345, 350, 355, 360. PE Node may then see a jump from sequence number 312 of packet 310 ("430D") to sequence number 348 of packet 345 ("6000") even though no packets have been dropped.

Note that in practice, line cards 123, 126 may not be synchronized, and as such the LCR switch itself may result in dropping or duplicating of packets. For example, the LCR switch may occur immediately after line card A 123 has transmitted packet 310 and line card B 126 has transmitted packet 345. The next packet actually transmitted over the network may be packet 350 and neither packet 315 nor packet 345 (those packets containing data "501C . . . ") will have been transmitted over the network.

Furthermore, the LCR switch may introduce additional variation in the packet delay experienced by the receiving node. For example, line card A 123 may transmit packet 310 immediately before the LCR switch of FIG. 3A and line card B 126 may transmit packet 345 immediately after the LCR switch. In this scenario, very little delay may be experienced by the receiving node between the receipt of packet 310 and packet 345. Similarly, an LCR switch may occur just before line card A 123 is about to transmit packet 315 and just after line card B 126 has transmitted packet 340, leading to a greater than expected delay between packet 310 and packet 345. Thus, the receiving node may experience a delay of almost the amount of time required to process two packets before receiving packet 345.

FIG. 3B is a schematic diagram of the exemplary system 300 of FIG. 3A after the occurrence of an LCR switch. As described above with reference to FIG. 3A, after the occurrence of an LCR switch, line card B 126 may be active and line card A 123 may be inactive. As such, packets 315, 320, 325, 330 may be dropped and packets 345, 350, 355, 360 may be forwarded through the network.

It should be noted that the example of FIGS. 3A-B is but one possible cause for PE Node 150 detecting an out of sequence condition. Other causes may include, for example, automatic protection switch ("APS"), rerouting in the network, and packet loss due to errors in the network or network congestion.

Figure 4A:
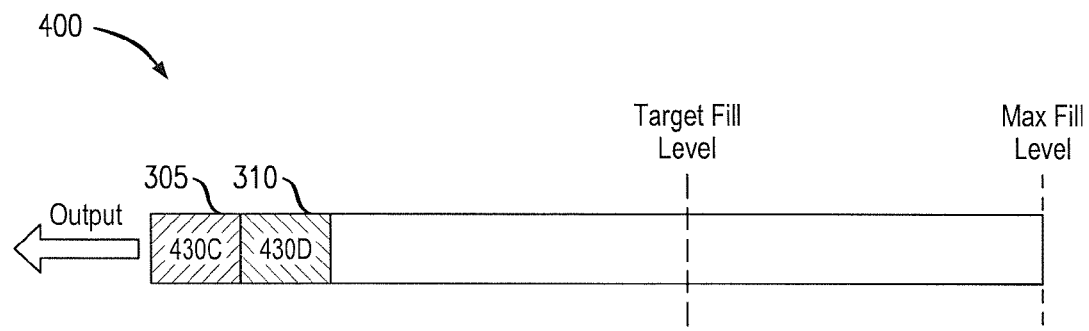
FIG. 4A is a schematic diagram of an exemplary playout buffer filled below a target fill level.
Figure 4B:
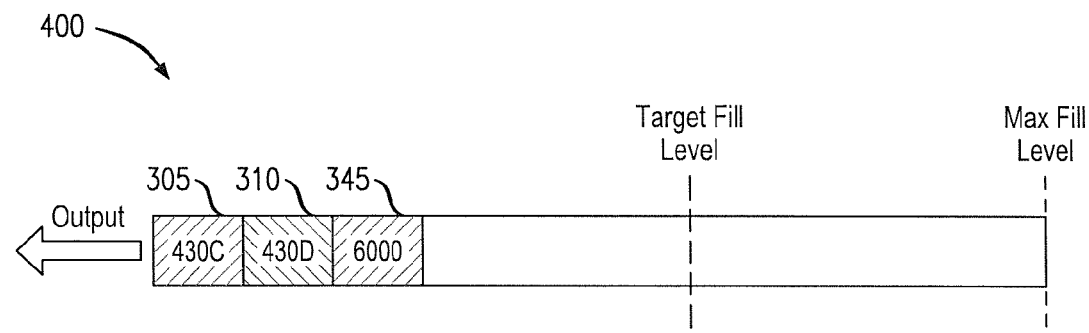
FIG. 4B is a schematic diagram of the exemplary playout buffer of FIG. 4A after receiving an out of sequence packet.
Figure 4C:
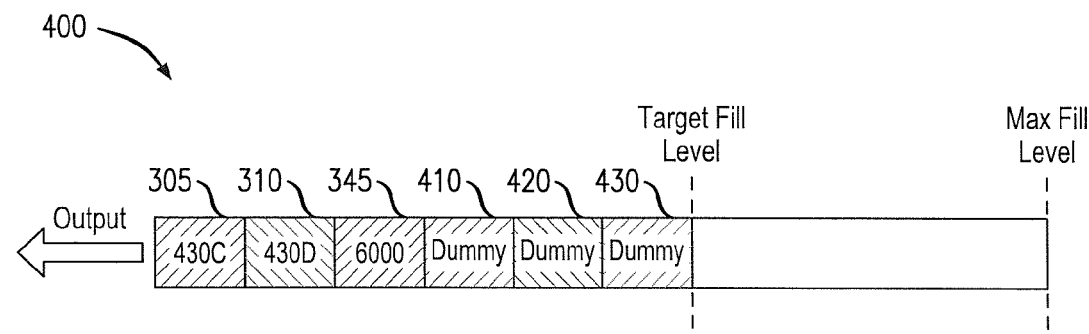
FIG. 4C is a schematic diagram of the exemplary playout buffer of FIG. 4B after receiving a packet in sequence with the last received packet and inserting three dummy packets.

FIGS. 4A-C show schematic diagrams of an exemplary playout buffer for handling sequence number errors in successively received packets. FIG. 4A shows exemplary playout buffer 400 before receiving an out of sequence packet. Playout buffer 400 may be, for example, the same as playout buffer 220 and couple to a processor 240 within a node 200. For the purposes of this example, playout buffer 400 is currently receiving packets from the flow described in connection with FIGS. 3A-B. Playout buffer 400 contains two packets 305, 310 having sequence numbers "430C" and "430D," respectively. Playout buffer 400 also includes a target fill level and a maximum fill level. Playout buffer 400 may be playing out the packets contained therein or may be waiting for the current fill level to reach the target fill level before beginning playout.

FIG. 4B shows exemplary playout buffer 400 after receiving an out of sequence packet. Node 200 has received packet 345, which carries a sequence number of "6000." Processor 240 may insert packet 345 into playout buffer 400 and wait for further packets in order to determine what action to take in response to the receipt of out-of-sequence packet 345. Processor 240 may additionally replace the payload of packet 345 with an idle pattern such as, for example, all 1's.

FIG. 4C shows exemplary playout buffer 400 after receiving an in sequence packet. After receiving packet 350 (not shown) which has the sequence number "6001", the processor determines that packet 350 is in sequence with packet 345 by determining that the sequence number of packet 350 is equal to the sequence number of packet 345 plus one or some other expected increment value, as described below with reference to FIG. 6. This indicates that a jump in sequence numbers has occurred between packet 310 and packet 345, leading processor 240 to begin normalizing playout buffer 400. Processor 240 may drop packet 350 and insert three dummy packets 410, 420, 430 in order to bring the playout buffer 400 up to the target fill level. Alternatively, processor 240 may accept packet 350 and insert it into playout buffer 400 instead of one of the dummy packets 410, 420, 430. Upon receipt of packet 355, processor 240 may determine that, because the current fill level of the playout buffer is equal to the target fill level, normalization is accomplished. Processor 240 may discard packet 355 and subsequently resume normal operation. Alternatively, processor 240 may accept packet 355, insert it into the playout buffer 400, and resume normal operation.

Various exemplary embodiments include a configurable maximum number of dummy packets to insert per received packet. In the above example, this number would be set to at least three, as evidenced by the insertion of three dummy packets 410, 420, 430 by processor 240 after the receipt of in-sequence packet 350. If this number were instead set to two, for example, processor 240 would have inserted only two dummy packets after receipt of packet 350. Then, upon receipt of in-sequence packet 355, the processor 240 may insert up to two additional dummy packets, depending on the number needed to bring the current fill level up to the target fill level. As described above, once the current fill level is brought up to the target fill level, the processor may resume normal operation.

Various exemplary embodiments include a configurable number of in-sequence packets to wait for before taking any corrective action in response to an out-of-sequence packet. In the above example, this number would be set to one, leading the processor to begin inserting dummy packets after receiving packet 350, the first in-sequence packet after the receipt of out-of-sequence packet 345. If, for example, this number were instead set to three, the processor 240 would wait for the receipt of the next three in-sequence packets 350, 355, 360 before inserting any dummy packets.

Various embodiments include methods of handling other possible received sequence numbers. For example, if instead of receiving packet 350, node 200 received packet 315 having sequence number "430E," processor 240 may determine that packet 315 is in sequence with the last received in-sequence packet 310. In this case, processor 240 may assume packet 345 was an anomaly, for example, a bad packet or a packet received out of order. To remedy this situation, the processor 240 may, after receipt of the predetermined number of in-sequence packets described above, drop a packet, such as packet 315 or the last received packet, and resume normal operation.

As a further example, if instead of receiving packet 350, the node received packet 320 having sequence number "430F," processor 240 may determine that packet 320 is the second packet intended to be received after packet 310, because the sequence number of packet 320 is two greater than that of packet 310. In this situation, the processor 240 may assume packet 345 was intended to be the first packet received after packet 310, but has an incorrect sequence number due to corruption of the sequence number or other hardware error. To remedy this situation, the processor 240 may simply accept packet 320 and, after receiving the predetermined number of in-sequence packets, resume normal operation.

Figure 5A:
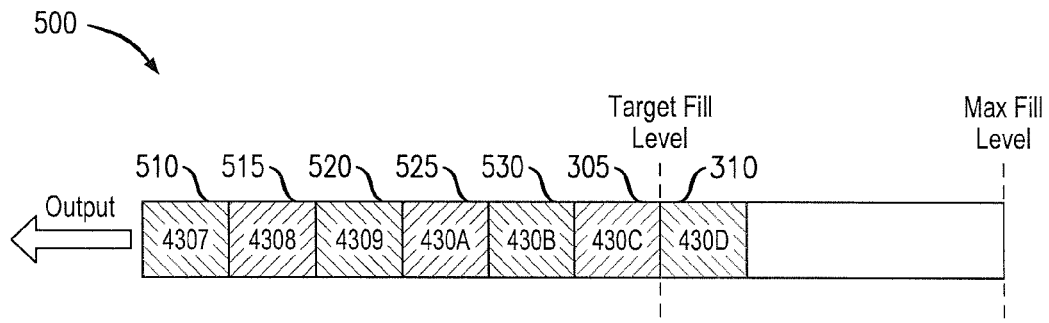
FIG. 5A is a schematic diagram of an exemplary playout buffer filled above a target fill level.
Figure 5B:
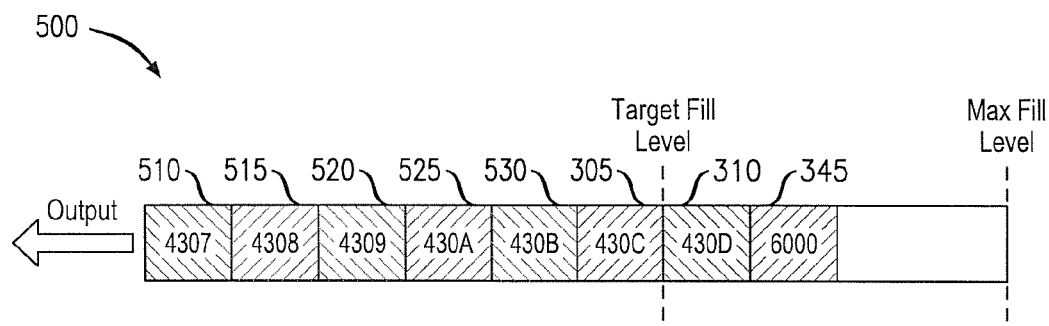
FIG. 5B is a schematic diagram of the exemplary playout buffer of FIG. 5A after receiving an out of sequence packet.
Figure 5C:
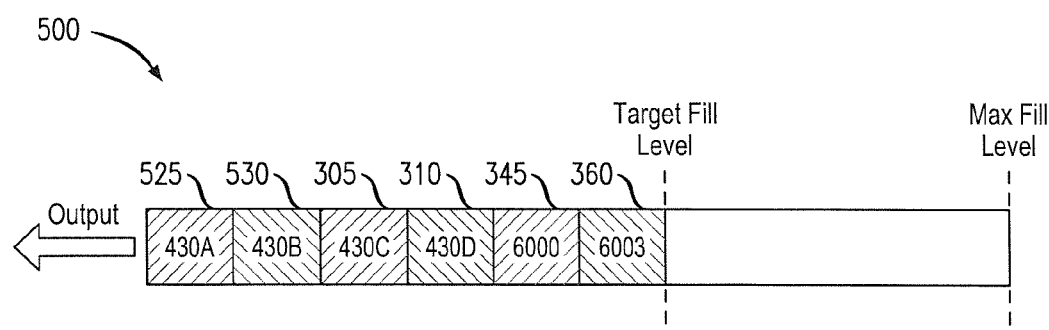
FIG. 5C is a schematic diagram of the exemplary playout buffer of FIG. 5B after receiving and discarding two in sequence packets, playing out three packets, and receiving another in sequence packet.

FIGS. 5A-C show schematic diagrams of an exemplary playout buffer for handling sequence number errors in successively received packets. FIG. 5A shows exemplary playout buffer 500 before receiving an out of sequence packet. Playout buffer 500 may be the same as playout buffer 220 and may be coupled to a processor 240 within a node 200. Playout buffer 500 includes a target fill level and a maximum fill level. Playout buffer 500 also contains seven in-sequence packets 510, 515, 520, 525, 530, 305, 310 having sequence numbers "4307," "4308," "4309," "430A," "430B," "430C," and "430D" respectively. Because the fill level is above the target fill level, playout buffer 500 is currently playing out packets to its associated circuit emulation engine.

FIG. 5B shows exemplary playout buffer 500 after receiving out-of-sequence packet 345 having sequence number "6000." Processor 240 may detect an out-of-sequence condition, insert packet 345 into playout buffer 500, and await further packets to trigger an in sequence condition and take appropriate action.

Upon receipt of packet 350 (not shown), processor 240 may determine that the preconfigured number of in-sequence packets (in this example, one) has been received. Processor 240 may then begin normalization of playout buffer 500. Because the current fill level is above the target fill level, processor 240 may simply discard packet 350. Meanwhile, the current fill level of playout buffer 500 decreases as it plays out packets 510, 515 contained therein.

FIG. 5C shows exemplary playout buffer 500 after completion of normalization. Upon receipt of in sequence packet 355 (not shown), processor 240 may determine that the fill level has reached the target fill level, discard packet 355, and resume normal operation. Alternatively, processor 240 may accept packet 355 (not shown) and resume normal operation. Thereafter, subsequently received packets, such as packet 360, may be inserted into playout buffer 500 as playout buffer 500 continues to play out packet 520.

Figure 6:
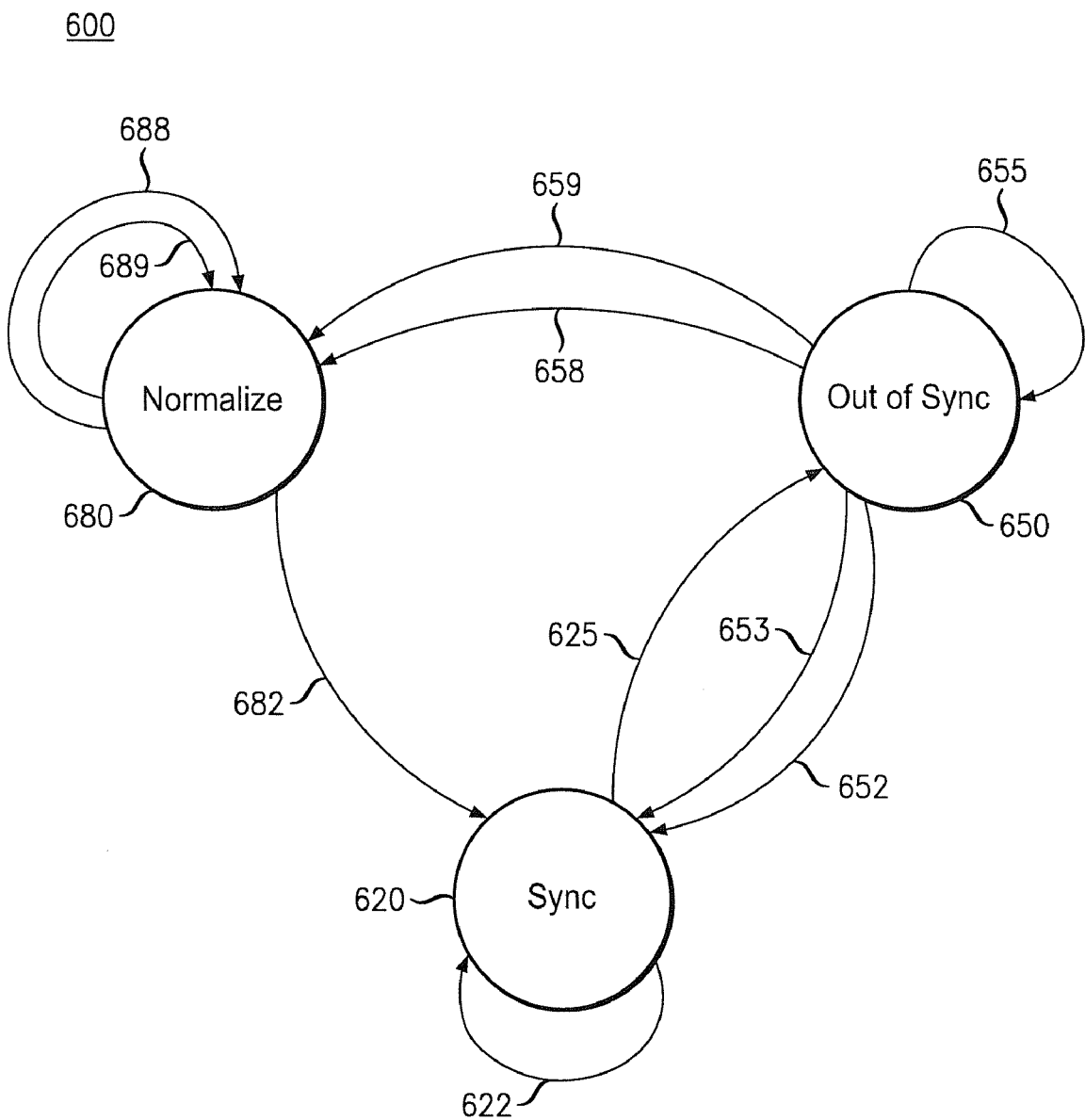
FIG. 6 is a schematic diagram of an exemplary state machine for a playout buffer that is capable of handling sequence number errors in successively received packets.

FIG. 6 shows a schematic diagram of an exemplary state machine for a playout buffer that is capable of handling sequence number errors in successively received packets. It should be apparent to those of skill in the art that state machine 600 is an abstraction of the function of an exemplary node, such as node 200, having a playout buffer. Various implementations might not actually implement a state machine, while achieving the same function. Further, state machine 600 may constitute a simplification of actual implementations. State machine 600 may include additional states such as, for example, an initialization state (not shown). State machine 600 may also be implemented across various components of node 200 or implemented as two or more actual state machines.

State machine 600 may include a sync state 620, an out of sync state 650, and a normalize state 680. During normal operation, playout buffer 220 may be in sync state 620. While in this state, the sequence number of any packet received may be checked against the sequence number of the most recently received packet to determine if the packet has arrived in sequence. For example, processor 240 may determine whether the sequence number of the packet is one greater than the sequence number of the last received packet.

If the packet has been received in sequence, it may be processed according to transition 622. Transition 622 may entail inserting the packet into playout buffer 220 and remaining in sync state 620. If, instead, it is determined that the packet has been received out of sequence, the packet may be processed according to transition 625. Transition 625 may include inserting the packet into the playout buffer 220 and moving into out of sync state 650.

While in out of sync state 650, any packet received may be checked against the last received packet and the last received in-sequence packet. As described above with reference to FIGS. 4A-C, if the sequence number of this current packet is one greater than the sequence number of the last received in-sequence packet, processor 240 may assume the last received packet was an anomaly, discard the current packet, and return to the sync state according to transition 652. If the sequence number of the current packet is two greater than the sequence number of the last received in-sequence packet, processor 240 may assume that the last received packet included an incorrect sequence number, insert the packet into the playout buffer 220, and return to the sync state 620 according to transition 653.

If, instead of either of the two above described cases, the sequence number of a received packet is one greater than the sequence number of the last received packet, indicating a jump in sequence numbers, processor 240 may discard the packet and move to normalize state 680 according to transition 658.

If the sequence number of a received packet does not match any of the three above described cases, playout buffer 220 may begin a renormalization process by waiting for the receipt of a predetermined number of in-sequence packets, disregarding the previously received out-of-sequence packet and following transition 655 as each further packet is received. Transition 655 may include discarding the received packet. After receiving the predetermined number of in-sequence packets, playout buffer 200 may discard the most recently received packet and move to normalize state 680 via transition 659. If, during this renormalization, playout buffer 220 underruns, playout buffer 220 may perform a reinitialization process. Such a reinitialization process may be performed according to any method known to those skilled in the art.

It should be apparent that, in various implementations, sequence numbers might be incremented by a value other than one for each successive packet. For example, a system might increment the sequence number by two instead of one for each packet. In such a case, three packets received bearing the sequence numbers "3D45," "3D47," "3D49" respectively would be in sequence because each sequence number is two higher than the previous number. The above described embodiments are easily modifiable to function in such systems. For example, processor 240 may assume an out-of-sequence packet was an anomaly upon receiving a packet having a sequence number equal to the sequence number of the last in-sequence packet plus the expected increment value. Likewise, an out-of-sequence packet might be determined to include an incorrect sequence number after the receipt of a packet having a sequence number equal to the sequence number of the last in-sequence packet plus double the expected increment value. Finally, the processor may detect a sequence number jump after receiving a packet with a sequence number equal to the sequence number of the last received packet plus the expected increment value.

As noted above with reference to FIGS. 4A-C, various embodiments may include a configurable number of in-sequence packets to wait for before taking corrective action in response to an out-of-sequence packet. In such embodiments, state machine 600 may include an additional transition (not shown) originating from and terminating at out of sync state 650. Such a transition would be followed when processor 240 has not yet seen the predetermined number of in-sequence packets.

When the playout buffer 220 is in the normalize state 680, processor 240 may, upon receipt of a subsequent packet, compare the current fill level of playout buffer 220 to a target fill level to determine what action to take in order to normalize the playout buffer 220. If the current fill level is below the target fill level, the processor 240 may normalize the playout buffer 220 according to transition 689. Transition 689 may include discarding the packet, inserting a number of dummy packets into the playout buffer, and remaining in normalize state 680. As described above with reference to FIGS. 4A-C, in various embodiments this number of dummy packets may not exceed a predetermined maximum number of dummy packets to be inserted per received packet.

If the current fill level is above the target fill level, the processor 240 may normalize the playout buffer 220 according to transition 688. Transition 688 may entail simply discarding the packet and remaining in the normalize state 680. If the current fill level is equal to the target fill level, then normalization may be complete. Processor 240 may then discard the packet and playout buffer 220 may enter sync state 620 according to transition 682.

Figure 7:
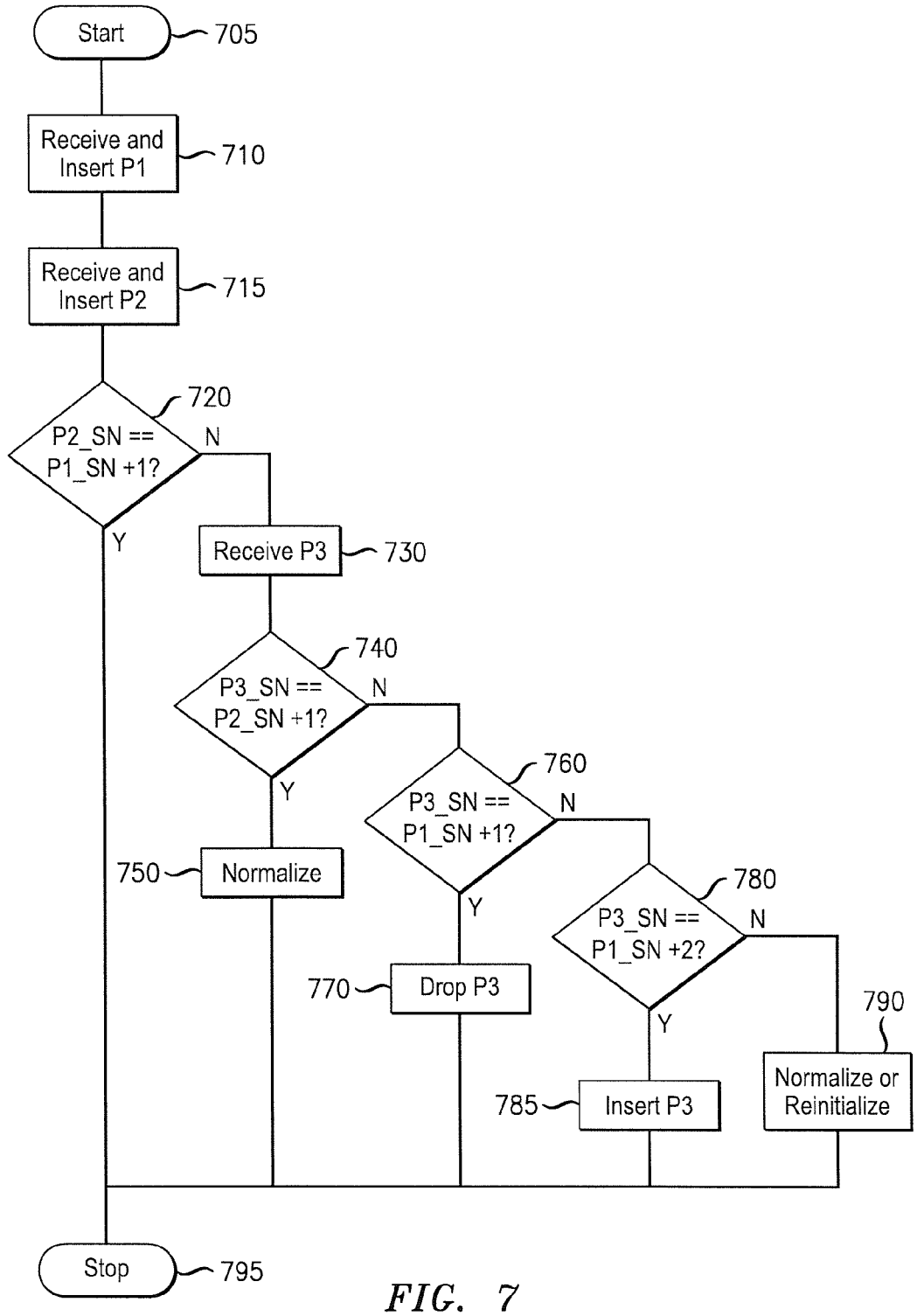
FIG. 7 is a flowchart showing an exemplary method for processing three consecutively received packets.

FIG. 7 is a flowchart showing an exemplary method for processing three consecutively received packets. It should be apparent that method 700 does not necessarily display a full implementation. Other processing steps for each packet may be implemented, for example, inserting each packet into the playout buffer or saving the sequence number of particular packets in memory.

Method 700 may describe the actions taken by processor 240 in response to the receipt of an out-of-sequence packet. Method 700 starts at step 705 and proceeds to step 710 where it receives a first packet, P1, and inserts it into playout buffer 220. Method 700 proceeds to step 715 where it receives a second packet, P2, inserts it into playout buffer 220, and moves to step 720.

At step 720, processor 240 checks whether P1 and P2 arrived in sequence by determining whether the sequence number (SN) of P2 is equal to the SN of P1 plus one. As described above with reference to FIG. 6, various embodiments may increment each sequence number by a number other than one. For the purposes of this example, the expected increment value is one. If P1 and P2 arrived in sequence, method 700 terminates at step 795. If P2 has arrived out of sequence, however, the method proceeds to step 730 where processor 240 receives a third packet, P3, and method 700 proceeds to step 740.

Note that in this example, the preconfigured number of in sequence packets to receive before taking corrective action is set to one. Therefore, with the receipt of P3, processor 240 may determine what corrective action to take.

At step 740, processor 240 determines whether there has been a jump in sequence numbers by determining whether the SN of P3 is equal to the SN of P2 plus one. If there has been a sequence number jump, processor 240 proceeds to step 750 where it may normalize the playout buffer 220. An exemplary method for performing the normalization in step 750 is described in further detail below with reference to FIG. 8. After the playout buffer 220 has been normalized, method 700 may terminate at step 795.

If processor 240 determines at step 740 that there has not been a jump in sequence numbers, method 700 may proceed to step 760. At step 760, processor 240 determines whether the SN of P3 is equal to the SN of P1 plus one. If so, P2 is determined to be an anomalous packet and method 700 may proceed to step 770, where processor 240 may discard P3. Method 700 may then terminate at step 795. If, instead, processor 240 determines at step 760 that P2 was not anomalous, method 700 may proceed to step 780. At step 780, processor 240 may determine whether the SN of P3 is equal to the SN of P1 plus two. If so, we may assume that P2 was the expected packet with an incorrect sequence number and method 700 may proceed to step 785, where processor 240 may insert P3 into playout buffer 220. Method 700 may then terminate at step 795.

If processor 240 determines at step 780 that the SN of P3 is not equal to the SN of P1 plus two, method 700 may move to step 790. Step 790 may include processor 240 waiting for a predetermined number of in-sequence packets to arrive, dropping each of these packets in turn, and then normalizing the playout buffer 220. Alternatively, if while waiting for a predetermined number of in-sequence packets to arrive, the playout buffer 220 underruns, processor 240 may reinitialize the playout buffer 220. Method 700 may then terminate at step 795.

Figure 8:
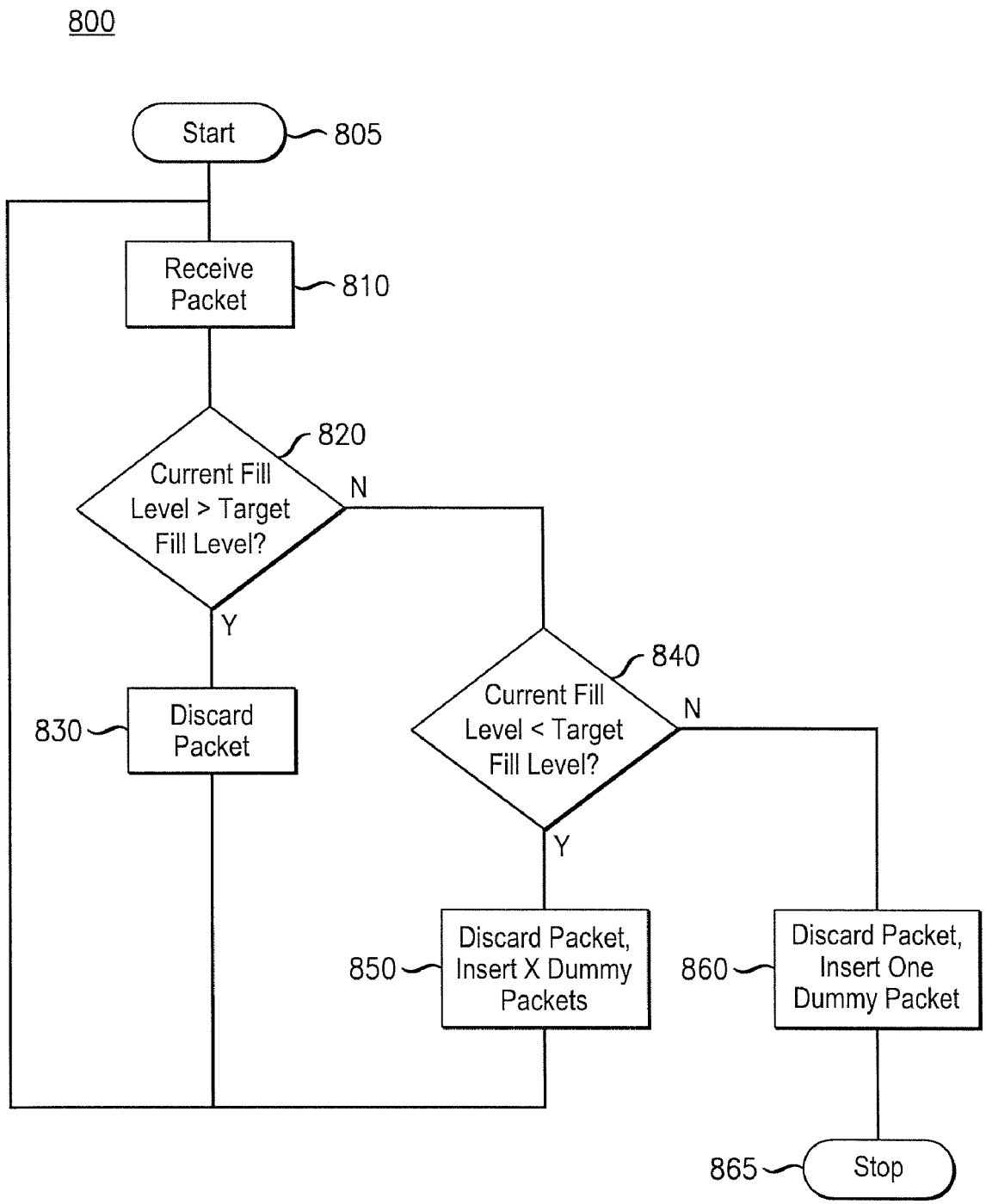
FIG. 8 is a flowchart showing an exemplary method for normalizing a playout buffer.

FIG. 8 is a flowchart showing an exemplary process for normalizing a playout buffer. Method 800 may be implemented on processor 240 and may correspond to step 750 of FIG. 7. Method 800 begins at step 805 and proceeds to step 810, where processor 240 receives a packet. Method 800 then moves to step 820 where it determines whether the current fill level of playout buffer 220 is greater than a preconfigured target fill level. If the current fill level is greater than the target fill level, method 800 proceeds to step 830 where it may discard the packet and then loop back to step 810.

If method 800 determines at step 820 that the current fill level is not greater than the target fill level, it may proceed to step 840 where it may determine whether the current fill level is below the target fill level. If the current fill level is below the target fill level, method 800 may discard the packet and insert a number of dummy packets into playout buffer 220 at step 850. The number of dummy packets inserted at step 850 may depend on the preconfigured maximum number of dummy packets to insert per received packet and the number of dummy packets needed to bring the current fill level up to the target fill level. Note that the number of packets required to bring the current fill level up to the target fill level may not be an integer multiple of the packet size. Solutions to this potential issue will be apparent to those of skill in the art. Method 800 may then loop back to step 810.

If method 800 determines at step 840 that the current fill level is not less than the target fill level, it may assume that the current fill level is equal to the target fill level and that the playout buffer 220 is therefore normalized. Method 800 may proceed to step 860 where it may discard the packet, insert a single dummy packet, and then terminate method 800 at step 865.

It should be apparent from the foregoing description that various exemplary embodiments may be implemented in hardware, firmware, and/or software. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A node for use in a packet-switched network providing a circuit emulation service, the node comprising:
   a receiver that receives a first packet, a second packet, a first set of at least one subsequent packet, and a second set of at least one subsequent packet, wherein each packet includes a sequence number (SN);
   a playout buffer encoded on a machine-readable storage medium;
   a circuit emulation engine that receives packets outputted from the playout buffer and transmits a circuit-switched signal based on the outputted packets; and
   a processor configured to:
      determine that the second packet is not in sequence with the first packet by determining that the SN of the second packet does not equal the SN of the first packet plus an expected increment value,
      determine whether the second packet represents a jump in SNs by determining whether the SN of a first subsequent packet of the first set of at least one subsequent packet equals the SN of the second packet plus the expected increment value, and
      when the second packet represents a jump in SNs, perform an operation to normalize the playout buffer upon receipt of each packet of the second set of at least one subsequent packet.

2. The node of claim 1, wherein the processor is further configured to:
   determine whether the second packet has been received out of order by determining whether the SN of the first subsequent packet equals the SN of the first packet plus the expected increment value,
   when the second packet has been received out of order, discard a packet of the first set of at least one subsequent packet,
   determine whether the second packet has an incorrect SN by determining whether the SN of the first subsequent packet equals the SN of the first packet plus double the expected increment value, and
   when the second packet has an incorrect SN, accept all packets of the first set of at least one subsequent packet.

3. The node of claim 2, wherein the processor is further configured to:
   normally operate in a sync state, wherein packets received in sequence are inserted into the playout buffer,
   upon receiving the second packet and determining that the second packet is not in sequence with the first packet, enter an out-of-sync state, wherein upon receiving the first subsequent packet, the processor determines whether the second packet represents a jump in SNs, has been received out of order, or has an incorrect SN,
   when operating in the out-of-sync state and the second packet has been received out of order, discard a last subsequent packet of the first set of at least one subsequent packet and enter the sync state,
   when operating in the out-of-sync state and the second packet has an incorrect SN, enter the sync state,
   when operating in the out-of-sync state and the second packet represents a jump in SNs, enter a normalize state, wherein the processor will normalize the playout buffer upon receiving each packet of the second set of at least one subsequent packet, and
   when operating in the normalize state and a current fill level of the playout buffer equals a target fill level of the playout buffer, enter the sync state.

4. The node of claim 1, wherein:
   the first set of at least one subsequent packet contains a number of packets equal to a predetermined number of in-sequence packets that must be received before taking corrective action in response to a packet received out of sequence, and
   the processor is further configured to:
      determine that each subsequent packet of the first set of at least one subsequent packet has been received in order by determining that the SN of each subsequent packet is equal to the SN of a packet received immediately prior to the subsequent packet plus the expected increment value, and
      wait for the determination that each subsequent packet of the first set of at least one subsequent packet has been received in order before renormalizing the playout buffer upon receiving each packet of the second set of at least one subsequent packet.

5. The node of claim 1, wherein the first set of at least one subsequent packet contains only the first subsequent packet.

6. The node of claim 1, wherein the processor, in normalizing the playout buffer, is configured to take at least one of the following actions:
   discard the packet of the second set of at least one subsequent packet, and
   insert at least one dummy packet into the playout buffer.

7. The node of claim 1, wherein, in normalizing the playout buffer upon receiving each packet of the second set of at least one subsequent packet, the processor is configured to:
   compare a current fill level of the playout buffer to a target fill level of the playout buffer,
   when the current fill level is less than the target fill level, insert a number of dummy packets, when the current fill level is greater than the target fill level, discard the received packet, and when the current fill level is equal to the target fill level, take no further action to normalize the playout buffer.

8. The node of claim 7, wherein the number of dummy packets does not exceed a predetermined maximum number of dummy packets to insert per received packet.

9. A method for handling out-of-sequence packets when inserting packets into a playout buffer in a node in a packet switched network, the method comprising:

receiving a first packet, a second packet, a first set of at least one subsequent packet, and a second set of at least one subsequent packet, wherein each packet includes a sequence number (SN);

determining that the second packet is not in sequence with the first packet by determining that the SN of the second packet is not equal to the SN of the first packet plus an expected increment value;

determining whether the second packet represents a jump in SNs by determining whether the SN of a first subsequent packet of the first set of at least one subsequent packet is equal to the SN of the second packet plus the expected increment value; and when the second packet represents a jump in SNs, gradually normalizing the playout buffer upon receipt of each packet of the second set of at least one subsequent packet.

10. The method of claim 9, further comprising:

determining whether the second packet has been received out of order by determining whether the SN of the first subsequent packet equals the SN of the first packet plus the expected increment value;

when the second packet has been received out of order, discarding a packet of the first set of at least one subsequent packet;

determining whether the second packet has an incorrect SN by determining whether the SN of the first subsequent packet equals the SN of the first packet plus double the expected increment value; and when the second packet has an incorrect SN, accepting all packets of the first set of at least one subsequent packet.

11. The method of claim 9, wherein the step of gradually normalizing the playout buffer comprises:

entering a normalize state, wherein upon receiving each packet of the second set of subsequent packets, a normalization operation is performed, the normalization operation comprising at least one of discarding the packet and inserting at least one dummy packet into the playout buffer, determining whether the playout buffer is normalized, and when the playout buffer is normalized, exiting the normalize state, whereby no further normalization operations will be performed.

12. The method of claim 9, wherein the first set of at least one subsequent packet contains a number of packets equal to a predetermined number of in-sequence packets that must be received before taking corrective action in response to a packet received out of sequence, and the method further comprises:

determining that each subsequent packet of the first set of at least one subsequent packet has been received in order by determining that the SN of each subsequent packet is equal to the SN of a packet received immediately prior to the subsequent packet plus the expected increment value; and waiting for the determination that each subsequent packet of the first set of at least one subsequent packet has been received in order before gradually renormalizing the playout buffer upon receipt of each packet of the second set of at least one subsequent packet.

13. The method of claim 9, wherein in the step of gradually normalizing the playout buffer upon receiving each packet of the second set of at least one subsequent packet comprises:

comparing a current fill level of the playout buffer to a target fill level of the playout buffer, when the current fill level is less than the target fill level, inserting a number of dummy packets, when the current fill level is greater than the target fill level, discarding the received packet, and when the current fill level is equal to the target fill level, taking no further action to normalize the playout buffer.

14. The method of claim 13, wherein the number of dummy packets does not exceed a predetermined maximum number of dummy packets to insert per received packet.

15. A non-transitory computer-readable storage medium encoded with instructions for performing the steps of:

receiving a first packet, a second packet, a first set of at least one subsequent packet, and a second set of at least one subsequent packet, wherein each packet includes a sequence number (SN);

determining that the second packet is not in sequence with the first packet by determining that the SN of the second packet is not equal to the SN of the first packet plus an expected increment value;

determining whether the second packet represents a jump in SNs by determining whether the SN of a first subsequent packet of the first set of at least one subsequent packet is equal to the SN of the second packet plus the expected increment value; and when the second packet represents a jump in SNs, gradually normalizing the playout buffer upon receipt of each packet of the second set of at least one subsequent packet.

16. The non-transitory computer-readable storage medium of claim 15, further comprising instructions for performing the steps of:

determining whether the second packet has been received out of order by determining whether the SN of the first subsequent packet equals the SN of the first packet plus the expected increment value;

when the second packet has been received out of order, discarding a packet of the first set of at least one subsequent packet;

determining whether the second packet has an incorrect SN by determining whether the SN of the first subsequent packet equals the SN of the first packet plus double the expected increment value; and when the second packet has an incorrect SN, accepting all packets of the first set of at least one subsequent packet.

17. The non-transitory computer-readable storage medium of claim 15, wherein the instructions for gradually normalizing the playout buffer comprise instructions for:

entering a normalize state, wherein upon receiving each packet of the second set of subsequent packets, a normalization operation is performed, the normalization operation comprising at least one of discarding the packet and inserting at least one dummy packet into the playout buffer, determining whether the playout buffer is normalized, and when the playout buffer is normalized, exiting the normalize state, whereby no further normalization operations will be performed.

18. The non-transitory computer-readable storage medium of claim 15, wherein the first set of at least one subsequent packet contains a number of packets equal to a predetermined number of in-sequence packets that must be received before taking corrective action in response to a packet received out of sequence, and further comprising instructions for:

- determining that each subsequent packet of the first set of at least one subsequent packet has been received in order by determining that the SN of each subsequent packet is equal to the SN of a packet received immediately prior to the subsequent packet plus the expected increment value; and
- waiting for the determination that each subsequent packet of the first set of at least one subsequent packet has been received in order before gradually renormalizing the playout buffer upon receipt of each packet of the second set of at least one subsequent packet.

19. The non-transitory computer-readable storage medium of claim 15, wherein the instructions for gradually normalizing the playout buffer upon receiving each packet of the second set of at least one subsequent packet comprise instructions for:

- comparing a current fill level of the playout buffer to a target fill level of the playout buffer,
- when the current fill level is less than the target fill level, inserting a number of dummy packets,
- when the current fill level is greater than the target fill level, discarding the received packet, and
- when the current fill level is equal to the target fill level, taking no further action to normalize the playout buffer.

20. The non-transitory computer-readable storage medium of claim 19, wherein the number of dummy packets does not exceed a predetermined maximum number of dummy packets to insert per received packet.

* * * * *

UNITED STATES PATENT AND TRADEMARK OFFICE
CERTIFICATE OF CORRECTION

PATENT NO. : 8,345,680 B2  
APPLICATION NO. : 12/437274  
DATED : January 1, 2013  
INVENTOR(S) : Andre Poulin et al.

Page 1 of 1

It is certified that error appears in the above-identified patent and that said Letters Patent is hereby corrected as shown below:

On the Title Page

Item (75), under "Inventors", please change the name "Andrian Ellsworth" to "Adrian Ellsworth".

Signed and Sealed this  
Twenty-third Day of April, 2013

Teresa Stanek Rea  
*Acting Director of the United States Patent and Trademark Office*